(12) United States Patent
Koval et al.

(10) Patent No.: US 11,825,383 B2
(45) Date of Patent: *Nov. 21, 2023

(54) METHOD, APPARATUS, AND COMPUTER PROGRAM PRODUCT FOR QUANTIFYING HUMAN MOBILITY

(71) Applicant: HERE GLOBAL B.V., Eindhoven (NL)

(72) Inventors: Dmitry Koval, Berlin (DE); Jerome Beaurepaire, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/805,871

(22) Filed: Jun. 8, 2022

(65) Prior Publication Data

US 2022/0303727 A1 Sep. 22, 2022

Related U.S. Application Data

(63) Continuation of application No. 17/138,241, filed on Dec. 30, 2020, now Pat. No. 11,388,555.

(51) Int. Cl.
*H04W 4/029* (2018.01)
*H04W 4/024* (2018.01)
(Continued)

(52) U.S. Cl.
CPC .......... *H04W 4/029* (2018.02); *G06V 20/182* (2022.01); *H04W 4/021* (2013.01); *H04W 4/024* (2018.02); *H04W 4/23* (2018.02); *G06V 20/54* (2022.01)

(58) Field of Classification Search
CPC ..... H04W 4/029; H04W 4/021; H04W 4/024; H04W 4/23; H04W 76/38; H04W 4/50;
(Continued)

(56) References Cited

U.S. PATENT DOCUMENTS 9,123,259 B2 9/2015 Zheng et al.
10,650,391 B2 5/2020 Yang et al.
(Continued)

OTHER PUBLICATIONS

Of The Support or Performing a Paging Message Distribution; CN 109565782 A; Rune et al. (Year: 2019).*

(Continued)

*Primary Examiner* — Meless N Zewdu
(74) *Attorney, Agent, or Firm* — ALSTON & BIRD LLP

(57) ABSTRACT

Provided herein is a method for quantifying and measuring human mobility within defined geographic regions and sub-regions. Methods may include: identifying sub-regions within a region; identifying static information associated with the sub-regions from one or more static information sources; obtaining dynamic information associated with the sub-regions from one or more dynamic information sources; determining correlations between elements of the static information associated with a respective sub-region and elements of the dynamic information associated with the respective sub-regions; generating a mobility score for the respective sub-region based, at least in part, on the correlations between the elements of the static information and the elements of the dynamic information associated with the respective sub-region; and providing the mobility score to one or more clients for guiding an action relative to the mobility score.

20 Claims, 9 Drawing Sheets

(51) Int. Cl.
*H04W 4/23* (2018.01)
*H04W 4/021* (2018.01)
*G06V 20/10* (2022.01)
*G06V 20/54* (2022.01)

(58) Field of Classification Search
CPC .......... H04W 4/02; H04W 8/08; H04W 8/16; H04W 8/18; H04W 8/20; H04W 16/24; H04W 64/00; H04W 88/02; H04W 28/0226; H04W 48/04; H04W 16/00; H04W 16/26; H04W 16/30; H04W 16/32; G06V 20/182; G06V 20/10; G06V 20/54; G06F 16/21; G06F 16/23; G06F 16/29; G06F 16/35; G06F 16/28; G06F 16/31; G06F 16/951; G06F 16/2458; G06F 16/2455; G06N 20/00; G06N 5/02; G06Q 10/10; G06Q 50/00; G06Q 30/02; G05B 13/02; H04L 12/24
See application file for complete search history.

(56) References Cited

U.S. PATENT DOCUMENTS

| | | | | |
|---|---|---|---|---|
| 10,904,705 | B2* | 1/2021 | Beaurepaire | H04W 4/029 |
| 11,037,064 | B2* | 6/2021 | Buda et al. | G06N 5/046 |
| 11,388,555 | B1* | 7/2022 | Koval et al. | H04W 4/029 |
| 2008/0045234 | A1* | 2/2008 | Reed | 455/456.1 |
| 2010/0177936 | A1 | 7/2010 | Ebliing et al. | |
| 2010/0322516 | A1 | 12/2010 | Xu et al. | |
| 2015/0078820 | A1 | 3/2015 | Brown | |
| 2015/0324704 | A1* | 11/2015 | Zhang et al. | G06N 5/02 |
| 2016/0142917 | A1 | 5/2016 | Calo et al. | |
| 2017/0230789 | A1 | 8/2017 | Shibayama et al. | |
| 2019/0375427 | A1* | 12/2019 | Whitt et al. | B60W 50/12 |
| 2021/0044958 | A1* | 2/2021 | Abedini et al. | H04W 4/08 |
| 2021/0383696 | A1* | 12/2021 | Park et al. | G06G 1/127 |

OTHER PUBLICATIONS

Method and Apparatus for Transmitting / Receiving Small Size Data In Mobile Communication System; JP 6261571 B2 (Year: 2018).*

Device and Method for Modifying Cell Measurements Based on Device Mobility; WO 2015138859 A1; Yiu et al. (Year: 2015).*

Mobile Router Information Management Server, Mobile Router, Mobile Router Network, and Communication Method for Same; WO 2012056821 A1; Mitomi et al. (Year: 2012).*

Cao et al., Understanding Metropolitan Crowd Mobility via Mobile Cellular Accessing Data, ACM Transactions on Spatial Algorithms and Systems. vol. 5, No. 2, Article 8 , Publication date: Jul. 2019 (18 pages).

Ex Parte Quayle Office Action for U.S. Appl. No. 17/138,241 dated Dec. 21, 2021.

Notice of Allowance for U.S. Appl. No. 17/138,241 dated Mar. 9, 2022.

Sevtsuk et al., Does Urban Mobility Have a Daily Routine? Learning from the Aggregate Data of Mobile Networks, Journal of Urban Technology, Mar. 31, 2010, vol. 17:1, pp. 41-60.

* cited by examiner

| | LOCATION (GPS) | LOCATION (WIFI) | SOCIAL MEDIA CHECK-IN | PUBLIC TRANSIT | RIDE SHARE | WEATHER | RESTAURANT | COFFEE SHOP | OFFICE BUILDING |
|---|---|---|---|---|---|---|---|---|---|
| LOCATION (GPS) | 1.00 | 0.90 | 0.85 | 0.30 | 0.70 | 0.05 | 0.20 | 0.20 | 0.20 |
| LOCATION (WIFI) | 0.90 | 1.00 | 0.80 | 0.25 | 0.60 | 0.05 | 0.60 | 0.60 | 0.60 |
| SOCIAL MEDIA CHECK-IN | 0.85 | 0.80 | 1.00 | 0.20 | 0.40 | 0.05 | 0.90 | 0.90 | 0.98 |
| PUBLIC TRANSIT | 0.30 | 0.25 | 0.20 | 1.00 | 0.05 | 0.50 | 0.20 | 0.20 | 0.20 |
| RIDE SHARE | 0.70 | 0.60 | 0.40 | 0.05 | 1.00 | 0.70 | 0.25 | 0.25 | 0.25 |
| WEATHER | 0.05 | 0.05 | 0.05 | 0.50 | 0.70 | 1.00 | 0.25 | 0.25 | 0.05 |
| RESTAURANT | 0.20 | 0.60 | 0.90 | 0.20 | 0.25 | 0.25 | 1.00 | 0.05 | 0.05 |
| COFFEE SHOP | 0.20 | 0.60 | 0.90 | 0.20 | 0.25 | 0.25 | 0.05 | 1.00 | 0.05 |
| OFFICE BUILDING | 0.20 | 0.60 | 0.90 | 0.20 | 0.25 | 0.05 | 0.05 | 0.05 | 1.00 |

FIG. 4

METHOD, APPARATUS, AND COMPUTER PROGRAM PRODUCT FOR QUANTIFYING HUMAN MOBILITY

CROSS-REFERENCE TO RELATED APPLICATIONS

This application is a continuation of and claims priority to U.S. patent application Ser. No. 17/138,241, filed on Dec. 30, 2020, the contents of which are hereby incorporated by reference in their entirety.

TECHNOLOGICAL FIELD

Example embodiments described herein relate generally to quantifying and measuring human mobility, and more particularly, to quantifying and measuring human mobility within defined geographic regions and sub-regions.

BACKGROUND

Population estimation and mobility measurement for a region is difficult based on the unique behavior of individuals within a population and often unpredictable movement. Census data provides population estimates for a region; however, census data is generally periodic, static population counts. Thus, census data only provides a static snapshot of population information. Further, census data does not provide information regarding where people actually are and instead relies upon residential addresses to establish head counts.

Population data is valuable for a variety of reasons ranging from demographic representation of a population to identifying where people are in order to target advertising. Further, population data over time or mobility data reveals migratory patterns of people through a region and travel patterns of people over time. More frequent population data that changes over shorter periods of time may further be useful for a variety of reasons, including the planning of roadways, public transit, or communication base station placement, among other uses.

BRIEF SUMMARY OF EXAMPLE EMBODIMENTS

At least some example embodiments are directed to quantifying and measuring human mobility within defined geographic regions and sub-regions. Embodiments may provide an apparatus including at least one processor and at least one memory including computer program code, the at least one memory and the computer program code may be configured to, with the processor, cause the apparatus to at least: identify sub-regions within a region; identify static information associated with the sub-regions from one or more static information sources; obtain dynamic information associated with the sub-regions from one or more dynamic information sources; determine correlations between elements of the static information associated with a respective sub-region and elements of the dynamic information associated with the respective sub-region; generate a mobility score for the respective sub-region based, at least in part, on the correlations between the elements of the static information and the elements of the dynamic information associated with the respective sub-region; and provide the mobility score to one or more clients for planning for guiding an action relative to the mobility score.

According to some embodiments, causing the apparatus to identify sub-regions within a region includes causing the apparatus to: obtain map data identifying road segments in the region containing the sub-regions; and partition the map data based on identified road segments in the region into the sub-regions. The sub-regions may include city blocks. Static information associated with the sub-regions may include point-of-interest information and building information, while dynamic information associated with the sub-regions may include mobility data representative of movement of people. The dynamic information sources may include one or more of a mobile device data source, a ride-share data source, a public transit data source, a shared mobility data source, a financial transaction data source, and an event-based data source. According to some embodiments, causing the apparatus to provide the mobility score to one or more clients for guiding an action relative to the mobility score may include causing the apparatus to provide the mobility score to a marketing client for predicting mobility patterns of people in at least one sub-region based on the mobility score.

The apparatus of some embodiments is further caused to: isolate static information associated with at least one sub-region for at least one static information element; isolate dynamic information associated with the at least one sub-region for at least one dynamic information element; and determine a cross-correlation between at least one static information element and the at least one dynamic information element to identify a value representing a degree of cross-correlation between the at least one static information element and the at least one dynamic information element, where the value contributes to the mobility score. The apparatus of some embodiments is further caused to: temporally partition the dynamic information and identify temporal patterns in the dynamic information for the sub-regions, where causing the apparatus to determine correlations between elements of the static information associated with a respective sub-region and elements of the dynamic information associated with the respective sub-region includes causing the apparatus to determine correlations between the elements of the static information and elements of the temporally partitioned dynamic information of the respective sub-regions, and where causing the apparatus to generate a mobility score for the respective sub-region from the correlations between the elements of the static information and the elements of the dynamic information associated with the respective sub-region may include causing the apparatus to generate a mobility score from the correlations between the elements of the static information and the elements of the temporally partitioned dynamic information associated with the respective sub-region.

The mobility score may represent a degree of uncertainty associated with mobility patterns of people within the sub-region. According to an example embodiment, the apparatus may further be caused to determine, from the dynamic information sources associated with the sub-regions, mobility data inflow, mobility data outflow, and mobility data pass-through for the sub-regions, where the mobility score for the respective sub-region includes a confidence that the correlations explain the mobility data inflow, mobility data outflow, and mobility data pass-through.

Embodiments of the present disclosure may provide a computer program product including at least one non-transitory computer-readable storage medium having computer-executable program code instructions stored therein, the computer-executable program code instructions including program code instructions to: identify sub-regions within a region; identify static information associated with the sub-regions from one or more static information sources; obtain dynamic information associated with the sub-regions from one or more dynamic information sources; determine correlations between elements of the static information associated with a respective sub-region and elements of the dynamic information associated with the respective sub-region; generate a mobility score for the respective sub-region based, at least on part, on correlations between the elements of the static information and the elements of the dynamic information associated with the respective sub-region; and provide the mobility score to one or more clients for guiding an action relative to the mobility score.

The program code instructions to identify sub-regions within a region may include program code instructions to: obtain map data identifying road segments in the region containing the sub-regions; and partition the map data based on the identified road segments in the region into sub-regions. The sub-regions may include city blocks. According to some embodiments, static information associated with the sub-regions includes point-of-interest information and building information, where dynamic information associated with the sub-regions includes mobility data representative of movement of people. The dynamic information sources may include one or more of: a mobile device data source, a ride-share data source, a public transit data source, a shared mobility data source, a financial transaction data source, and an event-based data source.

The program code instructions to provide the mobility score to one or more clients for guiding an action relative to the mobility score may include program instructions to provide the mobility score to a marketing client for predicting mobility patterns of people in at least one sub-region based on the mobility score. Embodiments may include program code instructions to: isolate static information associated with at least one sub-region for at least one static information element; isolate dynamic information associated with the at least one sub-region for at least one dynamic information element; determine a cross-correlation between the at least one static information element and the at least one dynamic information element to identify a value representing a degree of cross-correlation between the at least one static information element and the at least one dynamic information element, where the value contributes to the mobility score.

According to some embodiments, the computer program product may further include program code instructions to: temporally partition the dynamic information; and identify temporal patterns in the dynamic information for the sub-regions, where the computer program product to determine correlations between elements of the static information associated with a respective sub-region and elements of the dynamic information associated with a respective sub-region include program code instructions to determine correlations between the elements of the static information and elements of the temporally partitioned dynamic information of the respective sub-region, and where the program code instructions to generate a mobility score for the respective sub-region from the correlations between the elements of the static information and the elements of the dynamic information associated with the respective sub-region include program code instructions to generate a mobility score from the correlations between the elements of the static information and the elements of the temporally partitioned dynamic information associated with the respective sub-region.

The mobility score may represent a degree of uncertainty associated with mobility patterns of people within the respective sub-region. According to some embodiments, the computer program product may further include program code instructions to determine, from the dynamic information sources associated with the sub-regions, mobility data inflow, mobility data outflow, and mobility data pass-through for the sub-regions, where the mobility score for the respective sub-region includes a confidence that the correlations explain the mobility data inflow, the mobility data outflow, and the mobility data pass-through.

Embodiments of the present disclosure provide a method including: identifying sub-regions within a region; identifying static information associated with the sub-regions from one or more static information sources; obtaining dynamic information associated with the sub-regions from one or more dynamic information sources; determining correlations between elements of the static information associated with a respective sub-region and elements of the dynamic information associated with the respective sub-regions; generating a mobility score for the respective sub-region based, at least in part, on the correlations between the elements of the static information and the elements of the dynamic information associated with the respective sub-region; and providing the mobility score to one or more clients for guiding an action relative to the mobility score. Identifying sub-regions within the region may include: obtaining map data identify road segments in the region containing the sub-regions; and partitioning the map data based on the identified road segments in the region into the sub-regions.

Embodiments of the present disclosure provide an apparatus including: means for identifying sub-regions within a region; means for identifying static information associated with the sub-regions from one or more static information sources; means for obtaining dynamic information associated with the sub-regions from one or more dynamic information sources; means for determining correlations between elements of the static information associated with a respective sub-region and elements of the dynamic information associated with the respective sub-regions; means for generating a mobility score for the respective sub-region based, at least in part, on the correlations between the elements of the static information and the elements of the dynamic information associated with the respective sub-region; and means for providing the mobility score to one or more clients for guiding an action relative to the mobility score. The means for identifying sub-regions within the region may include: means for obtaining map data identify road segments in the region containing the sub-regions; and means for partitioning the map data based on the identified road segments in the region into the sub-regions.

BRIEF DESCRIPTION OF THE DRAWINGS

Figure 1:
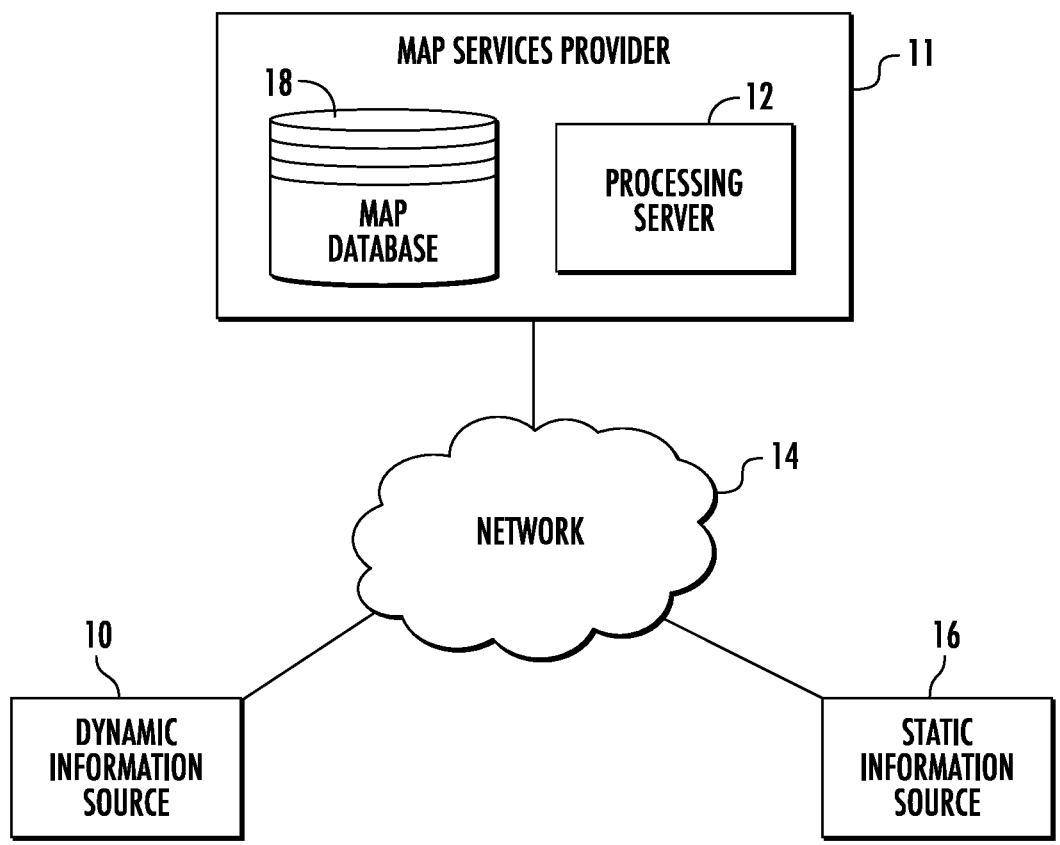
Figure 2:
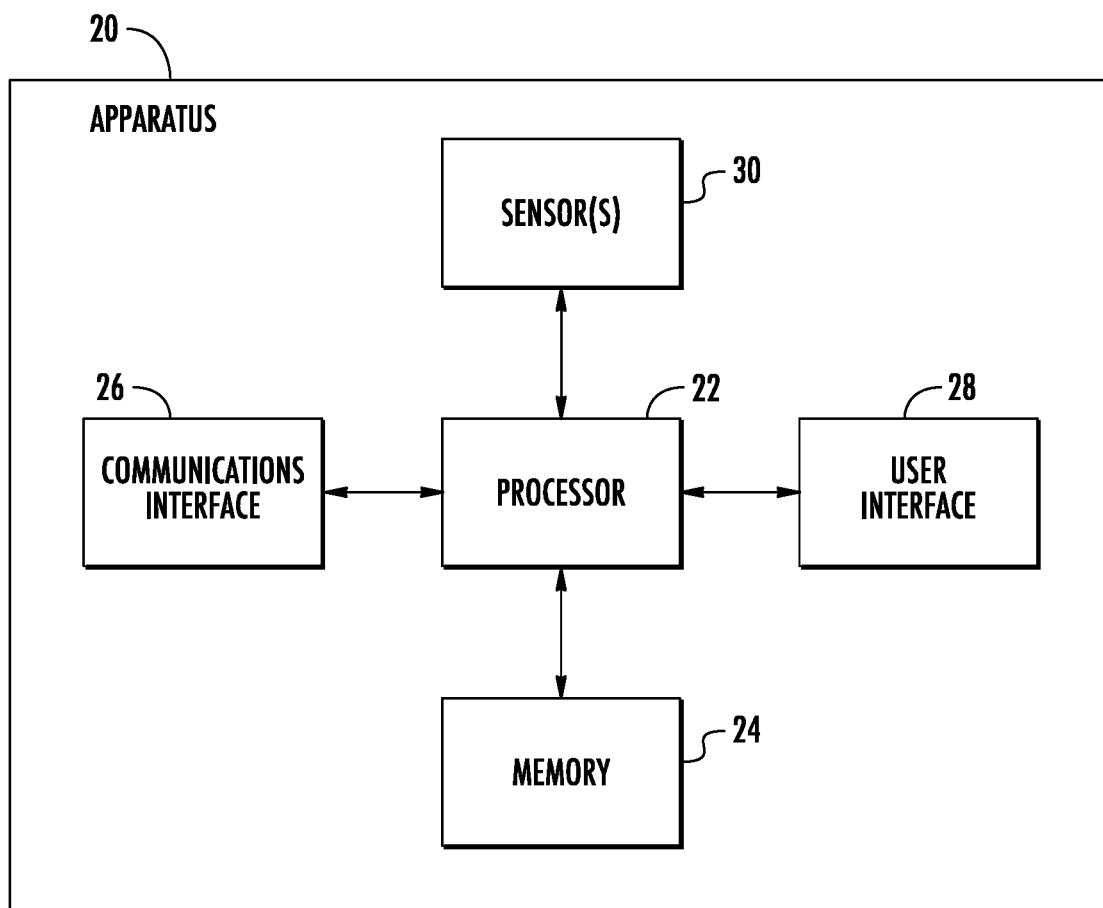
Figure 3:
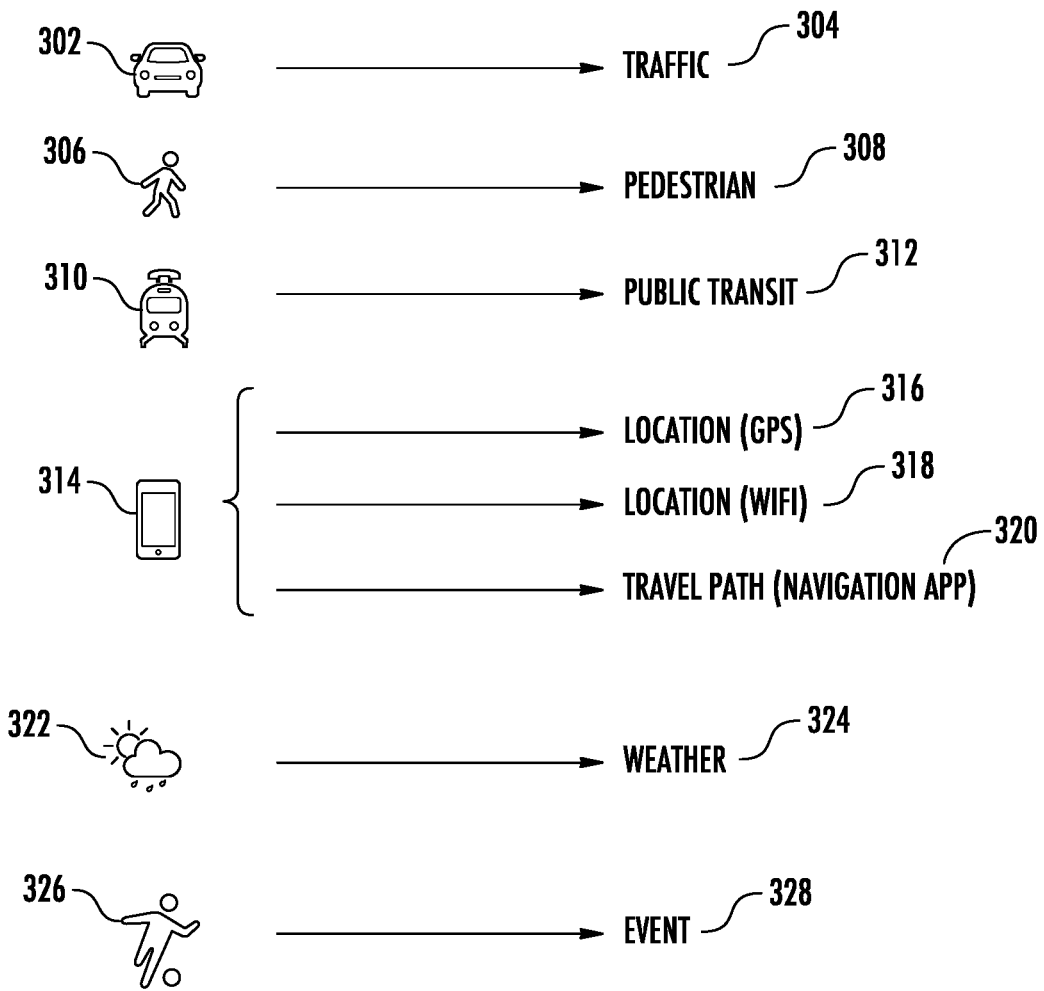
Figure 5:
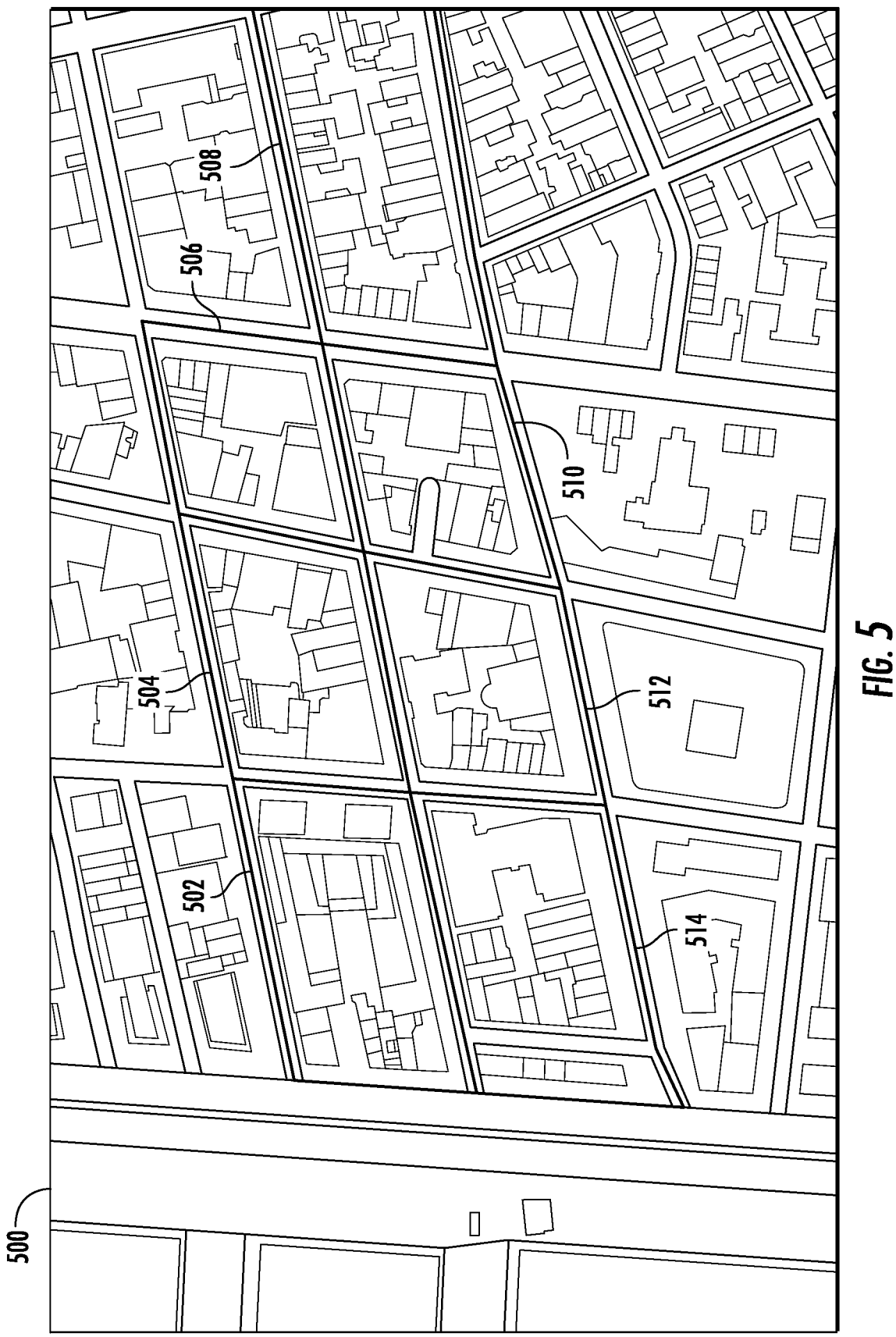
Figure 6:
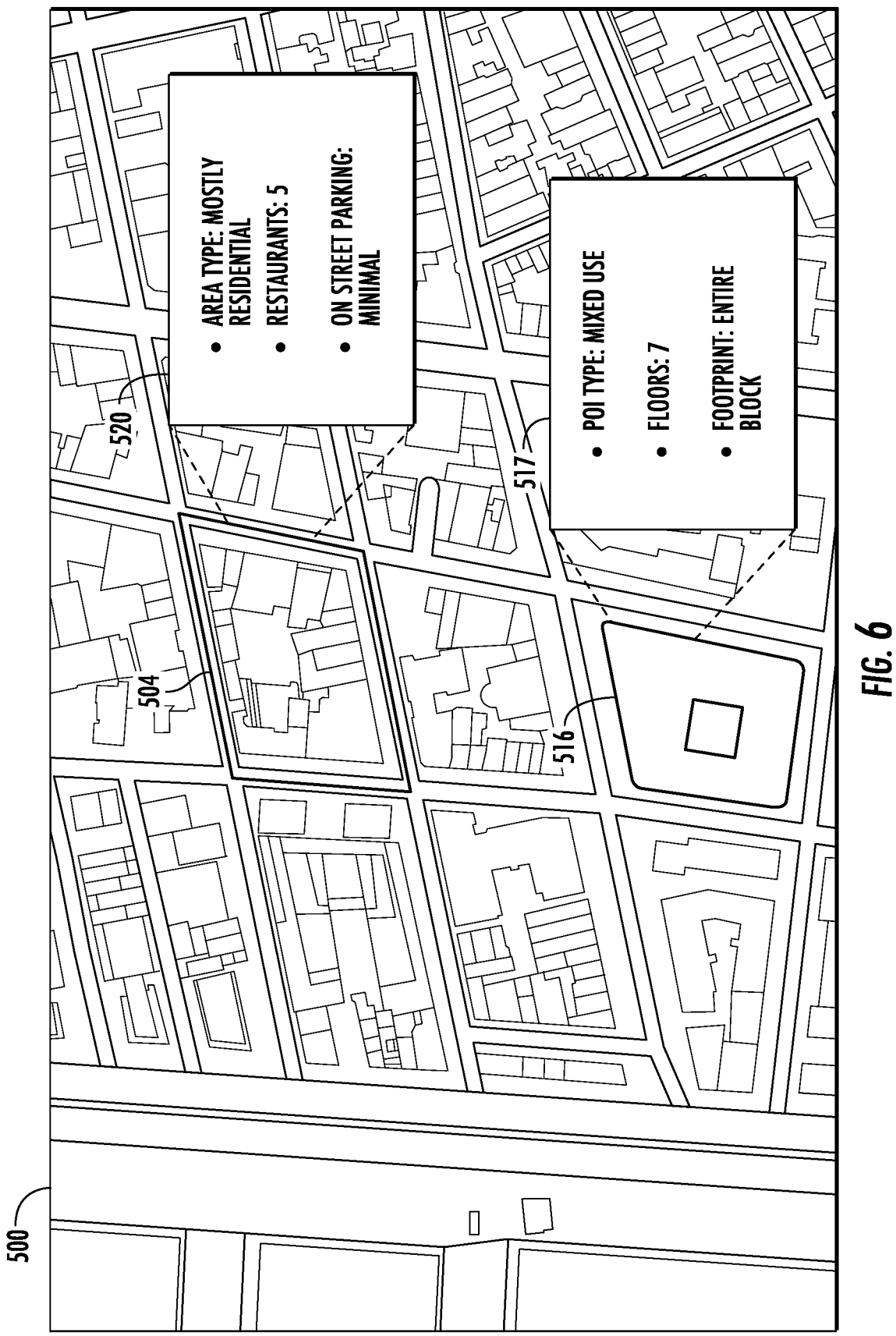
Figure 7:
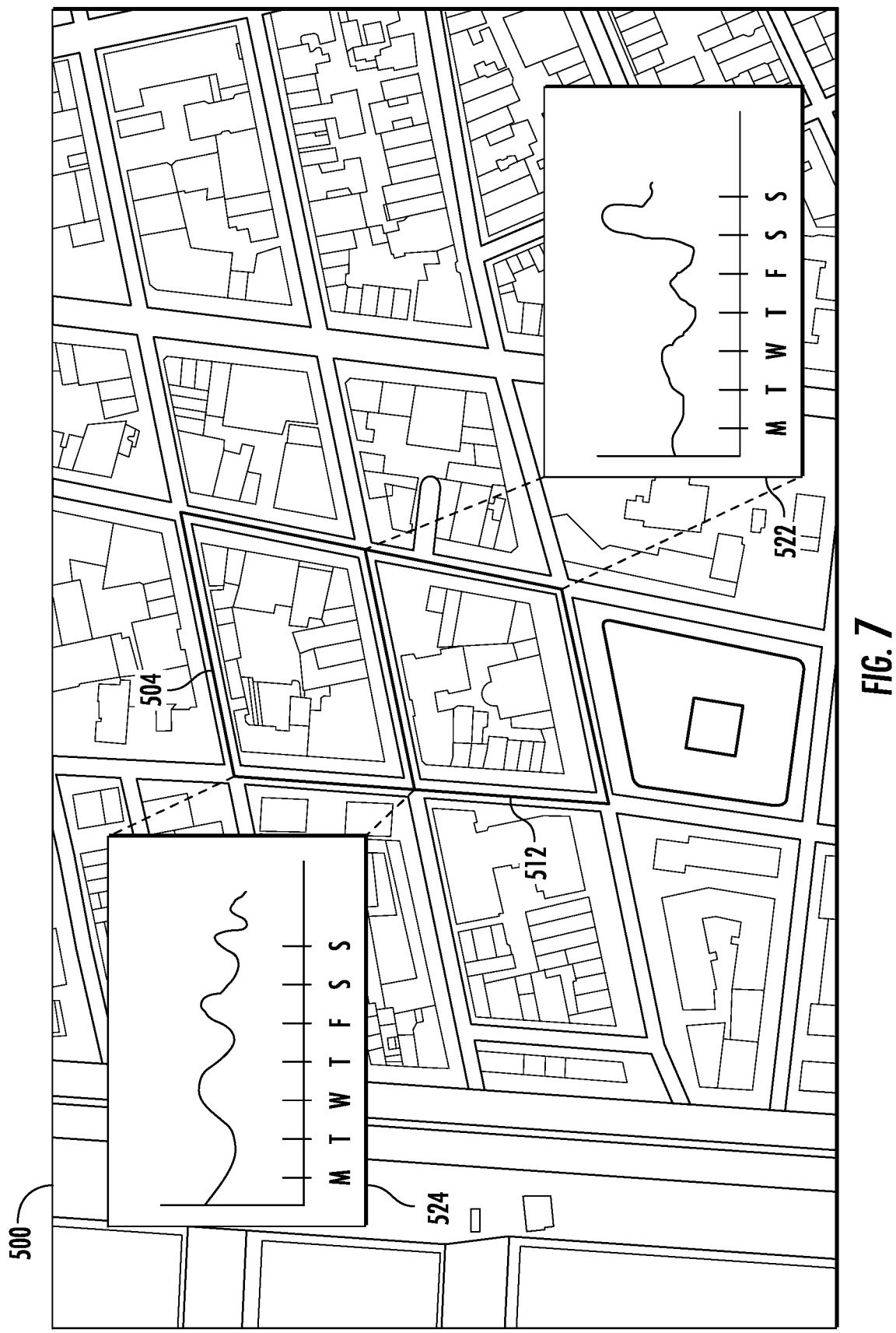
Figure 8:
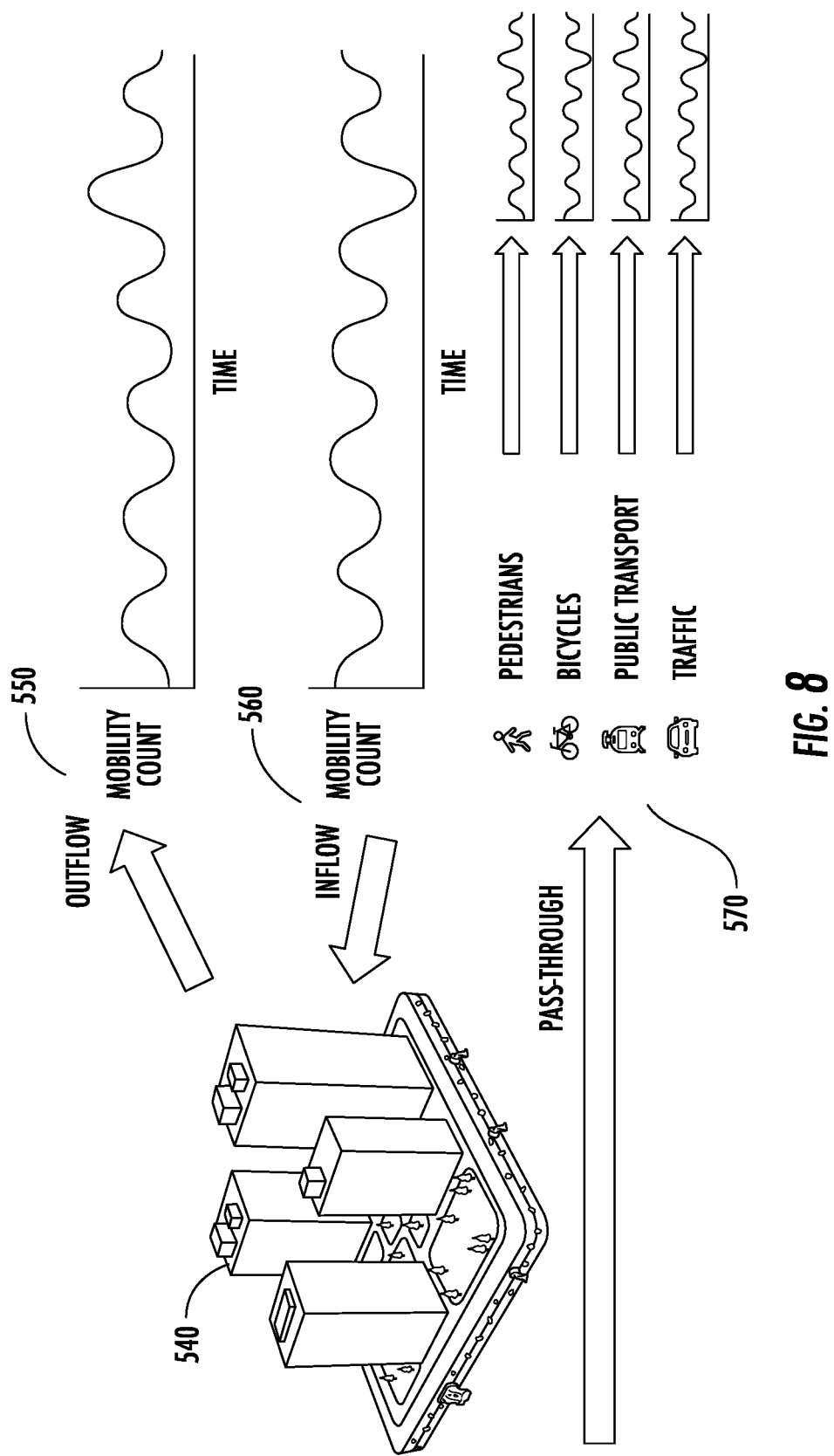
Figure 9:
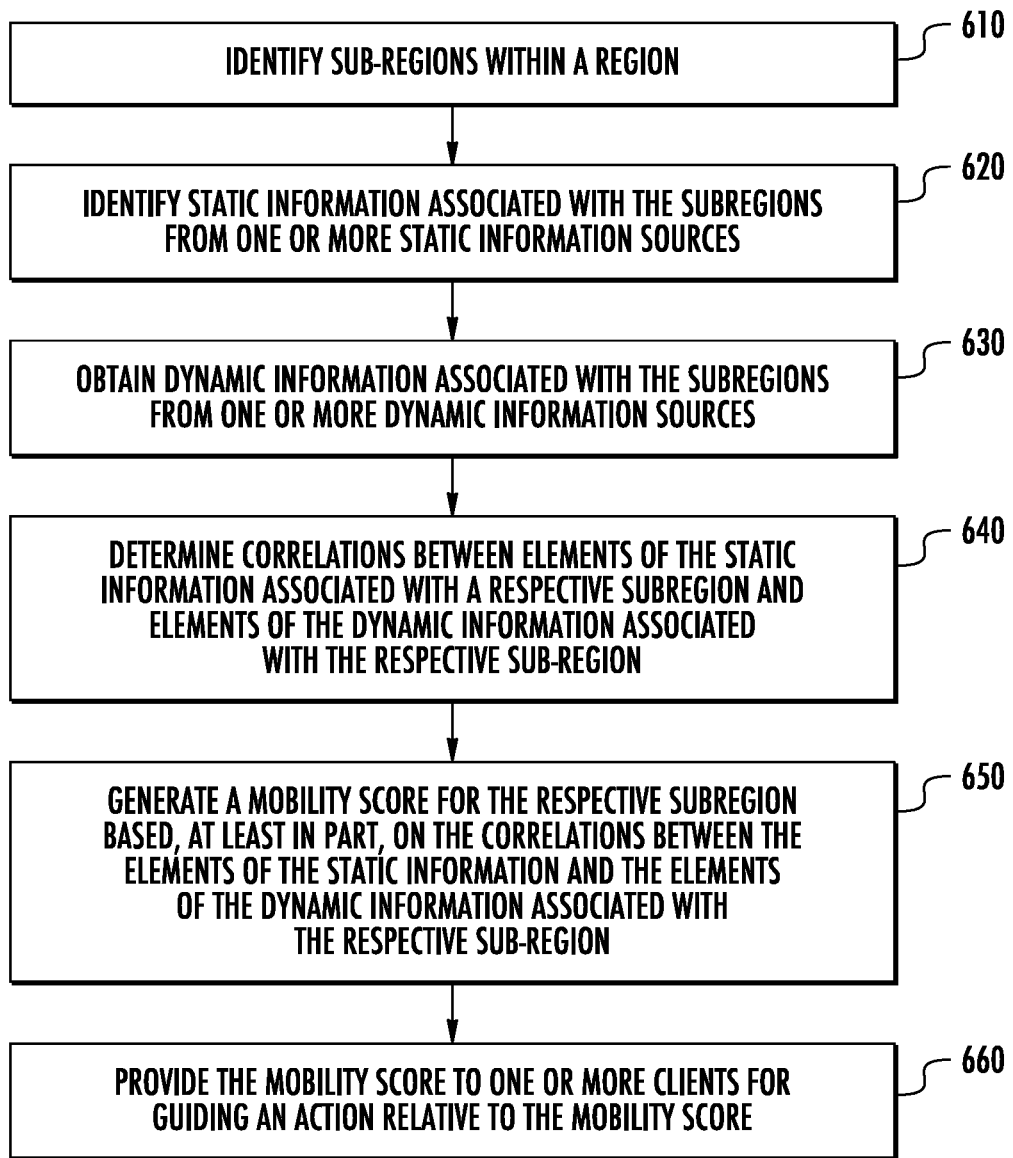

Having thus described certain example embodiments in general terms, reference will hereinafter be made to the accompanying drawings, which are not necessarily drawn to scale, and wherein:

FIG. 1 is a block diagram showing an example architecture of an example embodiment described herein;

FIG. 2 is a block diagram of an apparatus that may be specifically configured in accordance with an example embodiment of the present disclosure;

FIG. 3 illustrates sources of dynamic information according to an example embodiment of the present disclosure;

FIG. 4 depicts an N-squared chart including elements of static information and elements of dynamic information and illustrating the cross-correlation thereof according to an example embodiment of the present disclosure;

FIG. 5 illustrates a region with defined sub-regions according to an example embodiment of the present disclosure;

FIG. 6 illustrates defined sub-regions and static information elements associated therewith according to an example embodiment of the present disclosure;

FIG. 7 illustrates defined sub-regions and dynamic information elements associated therewith according to an example embodiment of the present disclosure;

FIG. 8 illustrates mobility data representing flux of a sub-region according to an example embodiment of the present disclosure; and FIG. 9 is a flowchart of a method for generating a mobility score for one or more sub-regions of a region according to an example embodiment of the present disclosure.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Methods, apparatus and computer program products are provided in accordance with an example embodiment in order to quantify and measure human mobility within defined geographic regions and sub-regions based on a plurality of static and dynamic data sources and the correlations therebetween. Census data can only provide a snapshot of population information for geographical areas of a geographic region. However, dynamic population estimation for finite geographic sub-regions including temporal population shifts and movement can be useful to a variety of industries and location-based services and providers. Embodiments provided herein estimate human mobility over time within geographic regions and, more granularly, within geographic sub-regions. Further, embodiments use static information from static information sources and dynamic information from dynamic information sources to determine an explained mobility score for a sub-region, where correlations between elements of static information and/or dynamic information inform the explained mobility score. Example embodiments are particularly useful within urban environments where the sub-regions may be defined as city blocks. Within urban environments, dynamic mobility data may not be available, may not be accurate (e.g., due to urban canyon effects on location signals), and may not be dense enough to be representative. Embodiments disclosed herein employ a combination of static information and dynamic information and the correlation between the static and dynamic information to quantify and measure human mobility and population density change over time within geographic regions and sub-regions. Embodiments further enable the generation of a model sub-region and using the model sub-region to be applied to infer mobility information for a similar sub-region that may lack dynamic information or lack sufficient dynamic information to establish mobility information for the similar sub-region. The similar sub-region may be established based on static information relating to the sub-region, such as a volume and type of buildings within the sub-region, types of points of interest, or other static information as described below.

Dynamic information may be generated by any of a plurality of dynamic information sources. Some dynamic information sources may include mobile devices (e.g., cell phones), vehicles, personal navigation devices, public transit vehicles, traffic monitoring, etc. Each of these examples of dynamic information sources may produce dynamic information establishing an identified location of a person or object associated with one or more people otherwise referred to herein as mobility data. Mobility data may fundamentally include location information of the person or object to which it is associated. Dynamic information is data that is regularly changing and is updated frequently, such as in real-time, upon receipt of new data (near real-time), or periodically in terms of seconds, minutes, or hours, typically. An instance of dynamic information information/data may comprise, among other information, location information/data, heading information/data, etc. For example, the dynamic information/data may include a geophysical location (e.g., latitude and longitude) indicating the location of a person or object at the time that the dynamic information/data is generated and/or provided (e.g., transmitted). The dynamic information/data may optionally include a heading or direction of travel. In an example embodiment, an instance of dynamic information/data may comprise a source identifier identifying the person or object that generated and/or provided the dynamic information/data, a timestamp corresponding to when the probe information/data was generated, and/or the like.

Further, based on the source identifier and the timestamp, a sequence of instances of dynamic information/data may be identified. For example, the instances of dynamic information of data corresponding to a sequence of instances of dynamic information/data may each comprise the same source identifier or an anonymized identifier indicating that the data is from the same, anonymous source. In an example embodiment, the instances of dynamic information/data in a sequence of instances of dynamic information/data are ordered based on the timestamps associated therewith to form a path.

Dynamic information as described herein may also include information associated with an environment (e.g., weather information) or event information (e.g., a scheduled sporting event, parade, or the like). Dynamic information therefore includes mobility data of people/objects/devices and information associated with a geographic region or sub-region that changes over time.

Dynamic information sources that produce mobility data, whether they include mobile devices, vehicles, personal navigation devices, public transit, etc., are referred to herein as probes producing dynamic information in the form of probe data. The gathered dynamic information in the form of probe data may be associated with geographic sub-regions of a geographic region. Associating the dynamic information with a geographic sub-area may include matching a location of the gathered dynamic information with the area represented by a geographic sub-area. As dynamic information may have a discrete location associated with each data point, each data point may be individually available to associate with any arbitrary geographic division generated, such that a geographic sub-region boundary may be established and the dynamic information within that boundary at a specific time period is associated with that geographic sub-region.

Static information for a geographic region and geographic sub-region relates to information that does not change over time, or is substantially similar over periods of time. For example, building sizes (square footage, number of floors, etc.) may change throughout time, but building sizes are substantially static for substantial amounts of time. Static information, as described herein, may include data that is not real-time data and is only updated on a periodic basis. Static information pertaining to a building may include the size, the type of use (residential, commercial, industrial, etc.) and proportions of the building used for each type of use, particularly in buildings that may include both apartments and short-term rentals (e.g. hotels) or mixed-use buildings such as residential buildings with commercial use on the street level. Static information may include information pertaining to points-of-interest such as point-of-interest types. Point-of-interest types may include categories of points-of-interest, such as restaurants, which may have sub-categories such as type of food, dine-in, take-out, delivery, price point, etc. Point-of-interest categories may broadly include retail stores, types of retail stores, businesses, museums, parks, service providers, automated teller machines, etc. Points-of-interest may, in some circumstances, be mobile, such as a food truck, whereby a food truck location would be established as dynamic information provided the food truck moves at least periodically.

Static information may be produced by a plurality of static information sources. For example, building sizes and locations may be provided by a municipality that has records of all buildings in a geographic region. Points-of-interest information may be from a service provider information source, such as a map services provider.

Static information may optionally include static population data, such as census data. Static population data generally includes establishing population count based on residential addresses of the population such that the static population data does not reflect any movement of the population during a day/month/year. Static population may include population data that is updated only periodically, and less frequently than a predefined amount of time, such as weekly, monthly, yearly, or longer. Further, static population data may be generated for a geographic region and the static population data may be broken down within that region into geographical areas. These geographical areas may correspond to boundaries such as zip codes, cities, counties, or other defined boundaries, for example.

Embodiments provided herein use static information and dynamic information associated with geographic regions and sub-regions to quantify and measure human mobility. Further, embodiments correlate different elements of static and/or dynamic information to establish an explained mobility score using a weighted correlation between the data sources.

To provide an improved manner of quantifying and measuring human mobility, a system as illustrated in FIG. 1 may be used. FIG. 1 illustrates a communication diagram of an example embodiment of a system for implementing example embodiments described herein. The illustrated embodiment of FIG. 1 includes a map services provider 11, a processing server 12, and a map database 18. As shown, the map services provider 11 may be in communication via a network 14, such as a wide area network, such as a cellular network, the Internet, or a local area network. However, the map services provider 11 may be in communication with the other elements of the system in other manners, such as via direct connection through direct communications between the map services provider 11 and data sources.

Examples of the data sources as described herein include a static information source 10 and a dynamic information source 16. The dynamic information source 16 may be a source of mobility data, such as a mobile device and may be embodied by a number of different devices including mobile computing devices, such as a personal digital assistant (PDA), mobile telephone, smartphone, laptop computer, tablet computer, vehicle navigation system, infotainment system, in-vehicle computer, or any combination of the aforementioned. The dynamic information source 16 may optionally be a server or network device configured to provide information such as weather information. Thus, the dynamic information source 16 may in some embodiments be a mobile device indicative of the movement of a person, while in other embodiments it may be a source of information that may or may not be mobile.

The static information source 10 may be any computing device configured to provide information to the map services provider 11 regarding static information relating to geographic regions and sub-regions. The static information source 10 may include a municipal information server, an archive of information (e.g., a database), or may even be embodied by a map services provider, such as the illustrated map services provider 11 or another similar entity. A map services provider may provide information such as point-of-interest location, type, hours of operation, or other data that is considered static information.

The processing server 12 of the map services provider 11 may also be embodied by a computing device and, in one embodiment, is embodied by a web server. Additionally, while the system of FIG. 1 depicts a single map services provider 11 and two information sources, systems of example embodiments may include any number of static or dynamic information sources, any number of map services providers, any number of databases, and any number of processing servers, which may operate independently or collaborate to support activities of the embodiments described herein.

The map database 18 may include one or more databases and may include information such as geographic information relating to road networks, points-of-interest, buildings, etc. Further, the map database 18 may store therein static population data, such as census data relating to populations of geographical sub-regions of a geographic region. The static population information may be provided by, for example, a municipality or governmental entity. The map database 18 may also include historical dynamic population or mobility data, such as historical traffic data, mobile device data, monitored area data (e.g., closed-circuit television), or the like. Thus, the map database 18 may be used to facilitate the quantifying and measuring of human mobility within defined geographic regions and sub-regions.

Regardless of the type of device that embodies the static data source 10 or the dynamic data source 16, the data source may include or be associated with an apparatus 20 as shown in FIG. 2. In this regard, the apparatus 20 may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device 24 may include, for example, one or more volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus 20 to carry out various functions in accordance with an example embodiment of the present invention. For example, the memory device 24 could be configured to buffer input data for processing by the processor 22. Additionally or alternatively, the memory device could be configured to store instructions for execution by the processor.

The processor 22 may be embodied in a number of different ways. For example, the processor 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 22 may include one or more processors configured in tandem via the bus to enable independent execution of instructions, pipelining and/or multithreading.

In an example embodiment, the processor 22 may be configured to execute instructions stored in the memory device 24 or otherwise accessible to the processor 22. Alternatively or additionally, the processor 22 may be configured to execute hard coded functionality. As such, whether configured by hardware or software methods, or by a combination thereof, the processor 22 may represent an entity (e.g., physically embodied in circuitry) capable of performing operations according to an embodiment of the present invention while configured accordingly. Thus, for example, when the processor 22 is embodied as an ASIC, FPGA or the like, the processor 22 may be specifically configured hardware for conducting the operations described herein. Alternatively, as another example, when the processor 22 is embodied as an executor of software instructions, the instructions may specifically configure the processor 22 to perform the algorithms and/or operations described herein when the instructions are executed. However, in some cases, the processor 22 may be a processor of a specific device (e.g., a head-mounted display) configured to employ an embodiment of the present invention by further configuration of the processor 22 by instructions for performing the algorithms and/or operations described herein. The processor 22 may include, among other things, a clock, an arithmetic logic unit (ALU) and logic gates configured to support operation of the processor 22. In one embodiment, the processor 22 may also include user interface circuitry configured to control at least some functions of one or more elements of the user interface 28.

Meanwhile, the communication interface 26 may include various components, such as a device or circuitry embodied in either hardware or a combination of hardware and software that is configured to receive and/or transmit data between a computing device (e.g. user device 10 or 16) and a server 12. In this regard, the communication interface 26 may include, for example, an antenna (or multiple antennas) and supporting hardware and/or software for enabling communications wirelessly. Additionally or alternatively, the communication interface 26 may include the circuitry for interacting with the antenna(s) to cause transmission of signals via the antenna(s) or to handle receipt of signals received via the antenna(s). For example, the communications interface 26 may be configured to communicate wirelessly with a head-mounted display, such as via Wi-Fi (e.g., vehicular Wi-Fi standard 802.11p), Bluetooth, mobile communications standards (e.g., 3G, 4G, or 5G) or other wireless communications techniques. In some instances, the communication interface 26 may alternatively or also support wired communication. As such, for example, the communication interface 26 may include a communication modem and/or other hardware/software for supporting communication via cable, digital subscriber line (DSL), universal serial bus (USB) or other mechanisms. For example, the communication interface 26 may be configured to communicate via wired communication with other components of a computing device.

The user interface 28 may be in communication with the processor 22, such as the user interface circuitry, to receive an indication of a user input and/or to provide an audible, visual, mechanical, or other output to a user. As such, the user interface 28 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface 28 may also be in communication with the memory 24 and/or the communication interface 26, such as via a bus.

The communication interface 26 may facilitate communication between different user devices and/or between the server 12 and user devices 10 or 16. The communications interface 26 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, a mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

The apparatus 20 of example embodiments, particularly when embodying a dynamic information source, may further include one or more sensors 30 which may include location sensors, such as global positioning system (GPS) sensors, sensors to detect wireless signals for wireless signal fingerprinting, sensors to identify an environment of the apparatus 20 such as image sensors for identifying a location of the apparatus 20, or any variety of sensors which may provide the apparatus 20 with an indication of location.

While the apparatus 20 is shown and described to correspond to an information source, be it dynamic or static, embodiments provided herein may include a user device that may be used for a practical implementation of embodiments of the present disclosure. For example, such an apparatus may include a laptop computer, desktop computer, tablet computer, mobile phone, or the like. Each of which may be capable of providing a graphical user interface (e.g., presented via display or user interface 28) to a user for interaction with a map providing human mobility information and explained mobility scores for geographic sub-regions within a mapped region as described further below. Embodiments of the apparatus may include components similar to those as shown in FIG. 2 through which a user may interact with dynamic mobility data presented on the display of a user interface for a device, such as apparatus 20.

Embodiments described herein relate quantifying and measuring human mobility, and more particularly, to quantifying and measuring human mobility within defined geographic regions and sub-regions. By fusing available static and dynamic data sources and establishing correlations therebetween, human mobility may be quantified and measured for finite, defined sub-regions of a geographical region. The results of such quantification and measurement may be provided in a visual representation on a user interface and made user-friendly through a service that provides dynamic mobility data for consumption by various industries and applications that may benefit from dynamic mobility measurement and quantification, in addition to establishing the veracity of such mobility data.

Static information may be received from sources such as a census bureau, local, regional, or national governmental entities, private population data collection/estimation services, map data service providers, or the like. This data, while useful, does not provide sufficient detail with regard to the fluidity of the movement of people throughout a day, week, month, season, or year, for example. However, static information may be useful in establishing an explained mobility score when combined with dynamic information.

Dynamic information data may be gathered through various sources. For example, probe data from a dynamic information source 10 may be collected from user's mobile devices such as cell phones which can report location and movement of a user. This data may be real-time probe data or historical probe data from users. Other probes such as probes associated with vehicles may provide dynamic information in the form of traffic data, which may also be real-time or historical traffic data. Historical traffic data can be considered dynamic information as it tracks the ebb and flow of a population as it moves over short periods of time and for specific time instances. Thus, it is not static population data identifying a static, unchanging location of a person. Dynamic information in the form of probe data may provide accurate location through positioning mechanisms employed by the probes, which may include GPS sensors, wireless fingerprinting, access point identifiers, etc. Other dynamic information may be collected through social media, such as through user check-ins at locations, users self-identifying locations or enabling location access within social media, attendance at events identified within social media, or the like. Dynamic information my further be gathered from parking events, shared mobility devices such as scooters, bike-shares, shared vehicles, etc. Public transit (e.g., trains, buses, etc.) and semi-private transit (e.g., taxis, rideshares, etc.) may further provide dynamic information that represents the movement of people through mobility data. Dynamic information sources such as public transit may include ridership information along with headcounts of people boarding and exiting a public transit vehicle at different stops. Another source of dynamic information may include a financial institution, where financial transactions represent dynamic information associated with a user performing the financial transaction at a specific location to conduct the financial transaction without providing identifying information regarding the individual.

Still further, dynamic information may be provided by devices monitoring specific locations, such as closed-circuit television cameras or security cameras that capture individuals in the field of view and may recognize individual people through image recognition software to provide a count of population in a field of view or a count of population passing through a field of view, such as in a particular direction to capture movement of the population toward or away from a location. Dynamic information may also be established by cameras on roadways such as at toll points along a roadway, along a road segment, or at an intersection. Other devices may be used to identify dynamic information such as near-field communication stations, such as radio-frequency identification antennas that may read the presence of a person through their identification, their mobile device, a key card, etc. Thus, data regarding dynamic information may be gathered from a wide variety of devices using infrastructure that is presently in place.

While dynamic information may be in the form of mobility data representing the movement of people, dynamic information may further include dynamically changing conditions and circumstances that may correlate with mobility data. For example, weather is dynamically changing and may have substantial impact on the mobility data within a geographic region. A park may experience a dramatic decrease in people within the park during adverse weather conditions. Dynamic information may also include event data, such as sporting events, parades, or other events that influence the population of a geographic region or sub-region.

Dynamic information is provided from a dynamic information source, and includes a plurality of dynamic information elements. Each dynamic information element corresponds to a type of information from the dynamic information source. Types of information for dynamic information elements may include, for example, mobile phone location from a global positioning system, and separately, mobile phone location from a different positioning means, such as from wireless fingerprinting. Types of information can include public transit vehicle location and movement, a specific social media platform (e.g., check-ins from Facebook), parking event information, pick up and drop off information from a rideshare service, etc. Each of these types of information is a dynamic information element from a dynamic information source. One dynamic information source may provide multiple dynamic information elements, such as when a mobile device provides dynamic information in the form of GPS location, wireless fingerprint location, social media information, etc. Thus, a dynamic information source may provide multiple dynamic information elements of dynamic information data.

FIG. 3 illustrates different dynamic information sources and dynamic information elements from those sources. As depicted, dynamic information may be in the form of traffic information data 304 that is from a dynamic information source 302, which may include a municipality, a map services provider, or a mobile device provider, for example. In this case, the traffic information is the dynamic information element. Pedestrian data 308 is another form of a dynamic information element from a dynamic information source 306 that may include a closed-circuit camera system that produces pedestrian data, for example. A dynamic information source 310 may provide dynamic information in the form of public transit movement 312 within a region. The dynamic information source 310 associated with public transit may provide dynamic information elements such as location of public transit vehicles (e.g., buses and trains), ridership numbers, rider intake/exit from the respective vehicles, etc. A dynamic information source of a mobile device 314 may provide a wide range of dynamic information elements. As illustrated, those dynamic information elements may include a location 316 generated by GPS, location 318 generated by Wi-Fi locating means, and a travel path 320 generated by a navigation application of the mobile device 314.

Various other dynamic information sources are available, such as weather information sources. These may be in the form of a National Weather Service (NWS), National Oceanic and Atmospheric Administration (NOAA), a non-governmental source, a local weather source, etc. FIG. 3 illustrates a weather information source 322 as a form of dynamic information source providing weather data 324 as the dynamic information. Dynamic information elements from a weather information source may include things like precipitation locations, warning/watch areas, etc. Dynamic information may be in the form of temporal events, such as sporting events. FIG. 3 illustrates an event 328 as dynamic information received from an event host 326 as the dynamic information source. As understood by one of ordinary skill in the art, dynamic information is widely varied and may be in the form of virtually any information that changes with time and reflects information that can inform the mobility of a population or individual person.

Static information sources, as described above, may be municipalities, city planners, census data, point-of-interest data sources (e.g., a map services provider), or the like. However, while mobile devices are generally dynamic information sources, they may also function as static information sources. Mobile devices may provide static information based on observations, such as identifying static objects, buildings, points-of-interest, or the like. Further the crowd sourcing of mobile device information may inform changes, albeit infrequent changes, to points-of-interest, such as when a restaurant changes names, closes/opens, changes cuisine or hours, etc. These static information elements may change occasionally, but not often enough to be dynamic information sources.

According to example embodiments described herein, a cross-correlation may be established between the various elements of dynamic information and static information. The cross-correlation may be in the form of an N-squared chart that represents the functional interfaces between different elements of information. All information elements, whether dynamic or static, may be represented on each axis of the N-squared chart to cross-correlate the effects of each data element on one another. The dynamic information elements and static information elements are inputs to the N-squared chart and the output generated indicates the correlation between each pair of information elements. This cross correlation may be summed for all information element pairs in order to establish an explained mobility score.

FIG. 4 illustrates a simplified example embodiment of an N-squared chart including along both axes the dynamic and static information elements 402. Where the same elements cross in the chart, the correlation is 1.00 or 100%. Some elements of information have strong relationships, while others do not. For example, restaurants, coffee shops, and office buildings all have a relatively low cross-correlation to location from a GPS source, noted in the chart as "Location (GPS)". This may be due to GPS performing poorly indoors. On the other hand, location based on Wi-Fi noted in the chart as "Location (Wi-Fi)" has a much stronger cross-correlation as many office buildings, restaurants, and coffee shops offer Wi-Fi connectivity. Social media has a generally strong cross-correlation with locations and POIs as a user may actively check-in affirming a location. Weather, as a form of dynamic information, appears to have a mild correlation with a restaurant or coffee shop, as people may be more reluctant to venture out during poor weather and more likely in good weather. However, the cross-correlation between weather and the office building is very low as office workers generally do not change behaviors based on weather. FIG. 4 is an example embodiment and certainly not exhaustive of all types of dynamic information elements or static information elements that may be considered. Further, the cross-correlation of the N-squared chart of FIG. 4 may be temporal. The correlations between different information elements may change with time. For instance, during a weekday in the middle of a workday correlations may be different than a weekend evening. Thus, N-squared charts may be used for various epochs that may be defined based on a repetitive pattern, such as 9 am-5 pm weekdays may have a first N-squared chart while 5 pm-2 am on Friday and Saturday may have a different N-squared chart.

While gathering and cross-correlating dynamic information and static information may aid in measuring human mobility, the information must be correlated to a geographic region to be of use. Example embodiments described herein define sub-regions within a geographic region within which the static information and dynamic information are used to establish an explained mobility score at a relatively high level of granularity. Embodiments of the present disclosure enable the measurement and quantification of human mobility level at a city block level by cross-correlating multiple data sources available at this level of spatial granularity.

Embodiments of the present disclosure use a geospatial partition scheme to segment a geographic region into small sub-areas. Arbitrary geometry boundaries, a city, or a particular spatial area may be partitioned into sub-regions. The mobility data for a given geographic sub-region may be dynamic in that it changes over time. The mobility data for a given area is not only broken down by geographic segments and sub-areas, but segmented temporally. A temporal partition scheme may be used, such as fifteen minute or one-hour time bins, for example. Embodiments provided herein establish a score to illustrate the reliability of mobility data for a sub-region. Further, embodiments can establish a score that that varies based on the time period for a sub-region, as mobility data for a sub-region may be more reliable at different times of the day where the correlation between data elements is different.

Using city blocks as a spatial partition allows the establishment of correlation between physical city structure (e.g., buildings, street network) and sources of data (point-of-interest density, mobile devices/probes, events at locations, etc.). Further, as the average GPS error is around five meters and cellular data error may be as high as 200 meters, using city blocks as the sub-regions described herein draw more accurate conclusions about mobility data in the area when contrasted to a larger sub-region, such as a district or square kilometer, for instance. Partitioning of a region into sub-regions using city blocks as the sub-regions capitalizes on geographic information that is already available. Map data for road networks, particularly in larger towns and cities, is readily available and can be implemented to divide a region into sub-regions. These sub-regions can then use multiple independent information sources, both static and dynamic, to calculate an explained mobility score for each sub-region. This explained mobility score can identify human mobility relative to the sub-region and identify the confidence with which the mobility information is formed. The use of city blocks delineated by the road network also permits aggregation and correlation of multiple sources of data with a common spatial denominator.

FIG. 5 illustrates an example embodiment of a map of a region 500 with sub-regions illustrated as 502-514, where the sub-regions are city blocks delineated by streets of a road network. Each of these sub-regions have associated therewith static information. The static information may include the mix of residential, commercial, and industrial occupancy of the sub-region, the volume of the buildings and/or a total floor area of the buildings, the category of the buildings (e.g., office building, residential building, mixed-use space, hotel, etc.), the points-of-interest, such as by point-of-interest category (e.g., restaurants, types of restaurants, retail store, grocery store, etc.). The static information for a sub-region or city block may represent a profile for that city block. That profile may be a measure or fingerprint of the various categories of buildings that can be present and various types of points-of-interest. The profile of the sub-region may be used to correlate one sub-region with another for use in modeling sub-regions or planned changes to sub-regions, as detailed further below.

FIG. 6 illustrates two sub-regions within the mapped region 500 and a sample profile or portion of a profile of the sub-regions. As shown, sub-region 504 is primarily residential having five restaurants and minimal on-street parking. Sub-region 516 has a mixed use four-floor building occupying the entire city block of the sub-region. The profiles of the two city block sub-regions illustrated in FIG. 6 are merely illustrative of the type of information that may be included in a profile of a sub-region.

FIG. 7 illustrates an example embodiment of dynamic information that may be gathered over a period of time for sub-regions. As shown, dynamic information 524 is shown for city block sub-region 504 illustrating a population count of the sub-region over a week based on one or more dynamic information sources. The population count may be established based on mobile device GPS location, social media check-ins, closed-circuit camera systems, or any dynamic data source capable of measuring a headcount within a predefined geographic sub-region. Further, the dynamic information 524 may be a cumulation of these data sources to identify the estimated total population of the sub-region based on the dynamic information available. The dynamic information for a period of time may be captured and used as historical mobility data for the sub-region and may facilitate the estimation of a future mobility model for the sub-region. Dynamic information 522 illustrates the mobility data for city block sub-region 512 illustrating the population over the prior week.

Embodiments of the present disclosure provide a mechanism by which mobility data quality is quantified and measured to provide a useful measure of how reliable mobility data is for a region and sub-regions therein. While an explained mobility score may be provided for a sub-region, the data behind the explained mobility score in the form of static data and dynamic data may have other, more specific applications. According to an example embodiment, a user of a system employing the explained mobility score may want to customize their view of the data or look deeper into the available data. In such an embodiment, a user, through a user interface, may be able to select sub-regions and view static and dynamic information elements and sources. A user may select a sub-region and view the N-squared chart for that sub-region to identify what cross-correlations factor in to the explained mobility score. Further, a user may be able to select certain information sources (both dynamic and static) and elements of dynamic and static information that the user wants to contribute to a customized explained mobility score. A user may select or exclude information elements from the N-squared chart that may not apply to them. For example, a user may want to isolate certain elements of information to establish cross-correlation between a subset of elements of information that relate to their interest. A user may want to isolate dynamic mobility data from mobile devices in an area and restaurants and coffee shops to identify trends relating to food services in a sub-region.

According to some embodiments, a user may import data elements for a sub-region that can provide the user specific information in which they are interested. A data element may be added to the N-squared chart or data elements within the N-squared chart may be manually adjusted to determine how an explained mobility score changes with customized cross-correlation scores. This may be desirable for a user planning a new business venture in a sub-region, where the user wants to establish how their business will impact mobility within the sub-region and how the sub-region may react to the new business venture. A user may adjust values for cross-correlation in an N-squared chart to understand or predict how different factors may affect mobility for that sub-region. In this way, the data collected through the dynamic and static data elements described herein can be employed in a custom user interface whereby users can manipulate data to learn, understand, and predict changes in mobility.

Embodiments described herein cross-correlate the static information, such as that found in city block sub-region profiles, with dynamic information, such as mobility data of people entering and leaving a sub-region. The cross-correlation between the dynamic information elements and the static information elements provides an indication of the validity of human mobility data relative to the sub-region. If data elements (both static and dynamic) for a sub-region have strong correlations, the mobility data for the sub-region may be estimated with a high degree of accuracy, such that the explained mobility score may be very high. The explained mobility score is a function of map features and the number of correlated independent sources of information, both static and dynamic. The cross-correlation provides a weighted factor that influences the total explained mobility score.

Embodiments provided herein not only compute the explained mobility score and quantify mobility data, but provide an indication of the flux of a region and sub-region. The flux relates to a number of people enter and exit a sub-region as a function of time. The flux can also relate to any type of dynamic mobility data source entering or exiting a sub-region, such as public transit vehicles, bicycles, cars, mobile phones, etc. However, the flux of people entering and exiting as well as persisting within a sub-region can be estimated through example embodiments provided herein along with a measure of confidence of the estimate based on the explained mobility score. The explained mobility score can be associated with the flux and provide a measure of the degree of confidence of the estimate of people entering (inflow) into a sub-region, the estimate of people exiting (outflow) from a sub-region, and the estimate of people persisting (remaining) in the sub-region. This provides an indication of the pass-through mobility data for a sub-region as well as the persistent, non-pass-through mobility data.

According to an example embodiment, if there is an event such as a concert within a given sub-region, an influx of people may be observed from mobility data (e.g., from vehicles, people, other transit means, etc.). The influx from the mobility data may be cross-correlated with the event with a high degree of correlation. The event would explain this influx and the explained mobility score would reflect this strong correlation, providing a high degree of confidence in the observed influx of mobility data. FIG. 8 illustrates a graphical representation of this flux with mobility data inflow 560, mobility data outflow 550, and mobility data pass through traffic 570 for a geographic sub-region 540.

The explained mobility score as established herein may provide a robust indicator of the reliability of mobility data for a region. Further, as noted above, since the cross-correlation between data elements (both static and dynamic) may change during different time periods (e.g., different times of the day, different days of the week, different seasons of the year, etc.), the explained mobility score for a sub-region may also vary over time. The explained mobility score may be codified to illustrate the reliability of mobility data for an area. For example, if an explained mobility score is relatively high, indicating a substantial cross-correlation between different data sources, the explained mobility score may convey a "good" score where the mobility data can be relied upon. If the explained mobility score is relatively low, indicating a low degree of cross-correlation between data elements, the explained mobility score may convey a "neutral" score indicating that while mobility data is present in sufficient volume, the cross-correlation is low such that the mobility data may not be of high accuracy. If the volume of mobility data itself is low, such as if there is relatively little dynamic information, the explained mobility score may be a "poor" score indicating that there is insufficient mobility data to provide a reasonably accurate estimate for the sub-region.

While dynamic information data may provide a robust indicator of the presence of people, dynamic information data may also provide too much data from multiple dynamic information sources or dynamic information elements and may result in individuals being counted multiple times by different devices or different information elements, such as a user traveling in a vehicle functioning as a probe while also carrying a mobile device functioning as a probe. The fusion of static population data and dynamic information sources as described in example embodiments herein may provide a robust and reliable estimate of mobility data, particularly when the cross-correlation of information sources is robust and points to a high degree of reliability for mobility data.

Processing mobility data collected through different means may require an approach that can make reasonable estimations about the amount of people in small geographic sub-regions. Different data sources may provide different mobility estimations and may have different degrees of reliability and accuracy based on the features of an area within which a population is being evaluated. For example, probe data points from mobile devices may be reliable and relatively accurate when a population is in an open area with few obstructions, such as in a park or a suburban residential area. However, some areas may have rather sparse coverage, with few or no mobile devices providing probe data. For example, in dense urban environments, mobile devices within tall buildings may not provide probe data or may not provide reliable probe data. Further, in areas of poor signal coverage, mobile devices may not be able to report probe data. In other cases, mobility data may be over-estimated such as when one person who carries one or more smart phones or connected devices and is traveling in a connected vehicle sending probe data, and may be checked-in on social media. In such an embodiment, that single person may be counted three, four, five or more times based on their connected devices functioning as probes to generate probe data. Embodiments described herein use the cross-correlation of the different data elements, both static and dynamic, to evaluate the reliability of mobility data. This explained mobility score is used to provide a robust indicator of the reliability of mobility data.

Population data from dynamic data sources may be able to capture movement of persons from one area to another; however, probe data from dynamic data sources may be anonymized to preclude this depending on national or regional laws relating to data privacy, or due to user preferences with regard to data sharing. Probe data from dynamic data sources is not configured to be able to identify individuals; however, probe data may include random identifiers to identify data source which may enable differentiation between different data source types.

Embodiments described herein may be useful for a wide variety of practical implementations, such as for establishing where people are at a given time, or how people move throughout a day. Such information may be beneficial to advertisers so they understand where to target specific advertisements and at what times to do so. Other use cases may include aviation where a city may be sensitive to the noise generated by aircraft approaching and departing an airport due to noise issues. Embodiments may provide an indication of preferred flight paths where flight paths are more desirable to be over less-dense areas. Census data may suggest that populations are static in residential areas. However, embodiments described herein may demonstrate that it is undesirable to fly over businesses or industrial areas during the day, and instead to fly over residential areas of lower population to disrupt the fewest number of people. Embodiments may also be used to plan for emergency services and staffing such that emergency services proximate low population areas at certain times of the day may require lower staffing levels than during times of day in which those same areas have a high population.

Given that mobility data may be used for city planning, advertising, business planning (e.g. opening a new business in a sub-region), the accuracy of mobility data is important such that low-reliability mobility data is not used to inform costly and extensive plans that may adversely affect a population based in erroneous data. Thus, embodiments provided herein using the explained mobility score can inform consumers of mobility data as to the reliability of the data on which decisions may be made. The explained mobility score may be used to inform marketing/advertising to identify customer density and guide advertising spend and locations. The explained mobility data may be used for site planning for a new business, such as a new restaurant or retail shop, where mobility data can be used from different sub-regions to identify the most beneficial location for a new business. Embodiments may optionally be used for predicting demand of public transit, occupancy of buildings, success of businesses, or the like. Wireless service providers may use the explained mobility score to identify reliable mobility data for network planning to understand which areas are more heavily trafficked and for planning capacity.

Example embodiments described herein may further be used to estimate mobility data for sub-regions that do not have mobility data or have insufficient mobility data. As detailed above, sub-regions and particularly city block sub-regions of a city may have a profile that identifies a plurality of static information elements used to define the sub-region. If a sub-region in another part of the city or a sub-region in a different city has a similar profile of static information elements, the mobility data for the sub-region having sufficient mobility data may be used to estimate the mobility data for the sub-region lacking sufficient mobility data. The similarity between sub-regions may be established based on a defined similarity function that may be user defined, such as a similarity function that focuses on the building type and volume within a sub-region, for example. A distance function may optionally be employed to help identify similar sub-regions based on proximity and the similarity of the profiles of the sub-regions. These similar sub-regions may be used to model mobility data for one another based on mobility data available within each sub-region.

FIG. 9 illustrates a flowchart of a method for quantifying and measuring human mobility, and more particularly, to quantifying and measuring human mobility within defined geographic regions and sub-regions according to an example embodiment of the present disclosure. As shown at 610, sub-regions within a region are identified. These sub-regions may be, for example, city blocks within a city defined by a network of roads within the region. Static information associated with the sub-regions is identified at 620 from one or more static information sources. Dynamic information associated with the sub-regions is obtained from one or more dynamic information sources as shown at 630. Correlations are determined at 640 between elements of the static information and elements of the dynamic information associated with a respective sub-region. A mobility score is generated at 650 for the respective sub-region based, at least in part, on the correlations between the elements of the static information and the elements of the dynamic information associated with the respective sub-region. The mobility score is provided to the one or more clients for guiding an action relative to the mobility score at 660.

As described above, FIG. 9 illustrates a flowchart of apparatuses 20, methods, and computer program products according to an example embodiment of the disclosure. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 24 of an apparatus employing an embodiment of the present invention and executed by the processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the method of FIG. 9 above may comprise a processor (e.g., the processor 22) configured to perform some or each of the operations (610-660) described above. The processor may, for example, be configured to perform the operations (610-660) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-660 may comprise, for example, the processor 22 and/or a device or circuit for executing instructions or executing an algorithm for processing information as described above.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to at least:
identify sub-regions within a region, each of the identified sub-regions having associated static information and dynamic information;
determine correlations between elements of the static information associated with a respective sub-region of the identified sub-regions and elements of the dynamic information associated with the respective sub-region;
generate mobility information for the respective sub-region based, at least in part, on the correlations between the elements of the static information and the elements of the dynamic information associated with the respective sub-region; and
provide for display of the mobility information for the respective sub-region on a user interface depicting a map of the region including the respective sub-region.

2. The apparatus of claim 1, wherein the static information and the dynamic information associated with each of the identified sub-regions comprises static information associated with the respective sub-region from one or more static information sources and dynamic information associated with the respective sub-region from one or more dynamic information sources.

3. The apparatus of claim 1, wherein the mobility information comprises information associated with mobility data entering the respective sub-region and information associated with mobility data exiting the respective sub-region.

4. The apparatus of claim 3, wherein the mobility information further comprises information associated with mobility data passing through the respective sub-region.

5. The apparatus of claim 1, wherein the mobility information comprises a mobility score, wherein the mobility score comprises an indication of reliability of the mobility information associated with the respective sub-region.

6. The apparatus of claim 1, wherein causing the apparatus to identify the sub-regions within the region comprises causing the apparatus to:
obtain map data identifying road segments in the region containing the identified sub-regions; and
partition the map data based on the identified road segments in the region into the identified sub-regions.

7. The apparatus of claim 1, wherein the static information associated with the identified sub-regions comprises point-of-interest information and building information, wherein the dynamic information associated with the identified sub-regions comprises mobility data representative of movement of people.

8. The apparatus of claim 7, wherein sources of the dynamic information comprise one or more of: a mobile device data source, a ride-share data source, a public transit data source, a shared mobility data source, a financial transaction data source, and an event-based data source.

9. The apparatus of claim 1, wherein the apparatus is further caused to:
isolate the static information associated with the respective sub-region for at least one static information element;
isolate the dynamic information associated with the respective sub-region for at least one dynamic information element; and
determine a cross-correlation between the at least one static information element and the at least one dynamic information element to identify a value representing a degree of the cross-correlation between the at least one static information element and the at least one dynamic information element, wherein the value contributes to a mobility score.

10. A computer program product comprising at least one non-transitory computer-readable storage medium having computer-executable program code instructions stored therein, the computer-executable program code instructions comprising program code instructions to:
identify sub-regions within a region, each of the identified sub-regions having associated static information and dynamic information;
determine correlations between elements of the static information associated with a respective sub-region of the identified sub-regions and elements of the dynamic information associated with the respective sub-region;
generate mobility information for the respective sub-region based, at least in part, on the correlations between the elements of the static information and the elements of the dynamic information associated with the respective sub-region; and
provide for display of the mobility information for the respective sub-region on a user interface depicting a map of the region including the respective sub-region.

11. The computer program product of claim 10, wherein the static information and the dynamic information associated with each of the identified sub-regions comprises static information associated with the respective sub-region from one or more static information sources and dynamic information associated with the respective sub-region from one or more dynamic information sources.

12. The computer program product of claim 10, wherein the mobility information comprises information associated with mobility data entering the respective sub-region and information associated with mobility data exiting the respective sub-region.

13. The computer program product of claim 12, wherein the mobility information further comprises information associated with mobility data passing through the respective sub-region.

14. The computer program product of claim 10, wherein the mobility information comprises a mobility score, wherein the mobility score comprises an indication of reliability of the mobility information associated with the respective sub-region.

15. The computer program product of claim 10, wherein the program code instructions to identify the sub-regions within the region comprise program code instructions to:
obtain map data identifying road segments in the region containing the identified sub-regions; and
partition the map data based on the identified road segments in the region into the identified sub-regions.

16. The computer program product of claim 10, wherein the static information associated with the identified sub-regions comprises point-of-interest information and building information, wherein the dynamic information associated with the identified sub-regions comprises mobility data representative of movement of people.

17. The computer program product of claim 16, wherein sources of the dynamic information comprise one or more of: a mobile device data source, a ride-share data source, a public transit data source, a shared mobility data source, a financial transaction data source, and an event-based data source.

18. The computer program product of claim 10, further comprising program code instructions to:
isolate the static information associated with the respective sub-region for at least one static information element;
isolate the dynamic information associated with the respective sub-region for at least one dynamic information element; and
determine a cross-correlation between the at least one static information element and the at least one dynamic information element to identify a value representing a degree of the cross-correlation between the at least one static information element and the at least one dynamic information element, wherein the value contributes to a mobility score.

19. A method comprising:
identifying sub-regions within a region, each of the identified sub-regions having associated static information and dynamic information;
determining correlations between elements of the static information associated with a respective sub-region of the identified sub-regions and elements of the dynamic information associated with the respective sub-region;
generating mobility information for the respective sub-region based, at least in part, on the correlations between the elements of the static information and the elements of the dynamic information associated with the respective sub-region; and
providing for display of the mobility information for the respective sub-region on a user interface depicting a map of the region including the respective sub-region.

20. The method of claim 19, wherein the static information and the dynamic information associated with each of the identified sub-regions comprises static information associated with the respective sub-region from one or more static information sources and dynamic information associated with the respective sub-region from one or more dynamic information sources.

* * * * *